United States Patent [19]

Hoess

[11] Patent Number: 5,748,141
[45] Date of Patent: May 5, 1998

[54] RADAR DEVICE WITH REDUCED POWER EMISSION

[75] Inventor: Alfred Hoess, Tegernheim, Germany

[73] Assignee: Siemens Aktiengesellschaft, Munich, Germany

[21] Appl. No.: 694,104

[22] Filed: Aug. 8, 1996

[30] Foreign Application Priority Data

Aug. 8, 1995 [DE] Germany .................. 195 29 173.5

[51] Int. Cl.$^6$ .................................................. G01S 13/93
[52] U.S. Cl. ................................................ 342/109; 342/70
[58] Field of Search ........................... 342/70, 71, 72, 342/109, 128, 104, 137

[56] References Cited

U.S. PATENT DOCUMENTS

| | | | |
|---|---|---|---|
| 5,341,144 | 8/1994 | Stove | 342/70 |
| 5,495,251 | 2/1996 | Gilling et al. | 342/70 |
| 5,563,602 | 10/1996 | Stove | 342/70 |

FOREIGN PATENT DOCUMENTS

95/12824  5/1995  WIPO .

OTHER PUBLICATIONS

Publication: Funkschau 1977, Book 9, pp. 389–393 (Neininger) "Abstandsradar gegen Auffahnunäflle [Distance radar against rear-end accidents]".

*Primary Examiner*—Daniel T. Pihulic
*Attorney, Agent, or Firm*—Herbert L. Lerner; Laurence A. Greenberg

[57] ABSTRACT

A radar device secured to a vehicle includes a transmitter for broadcasting continuously frequency-modulated radar signals over a time range. The time range is fixed as a function of a speed of the vehicle and is longer at a higher speed and shorter at a lower speed. A receiver receives the radar signals. An evaluation circuit compares the transmitted and received radar signals to ascertain information about the surroundings and in particular a distance from and a relative speed with respect to an object.

12 Claims, 4 Drawing Sheets

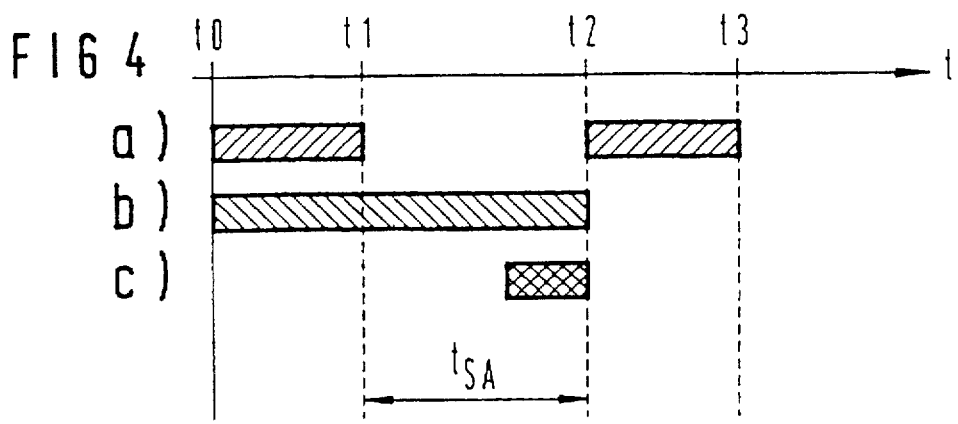
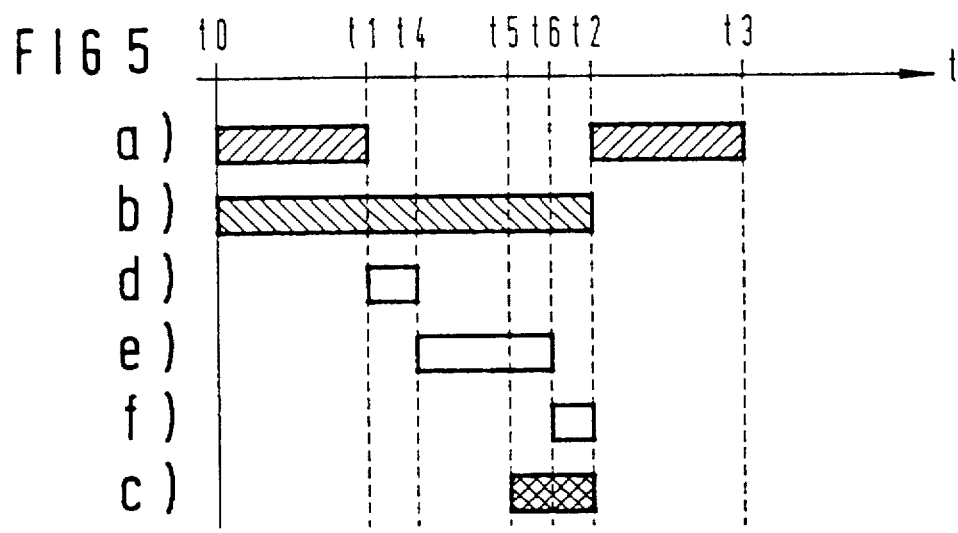
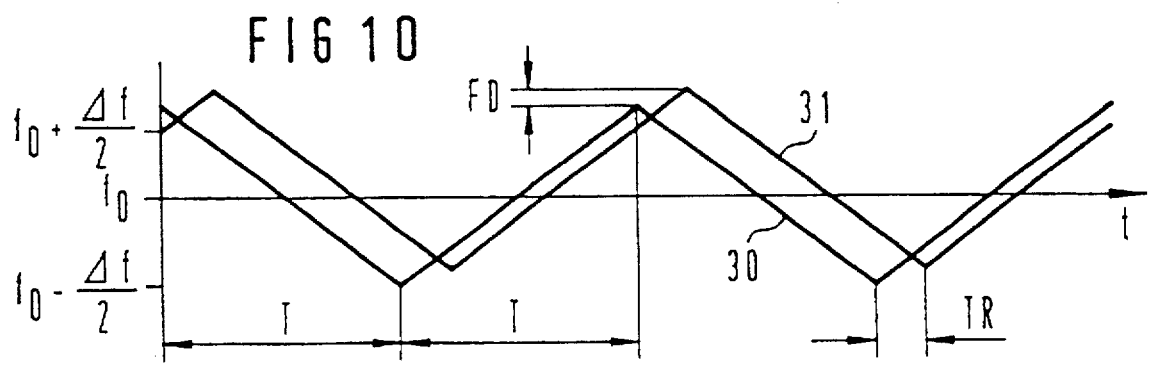

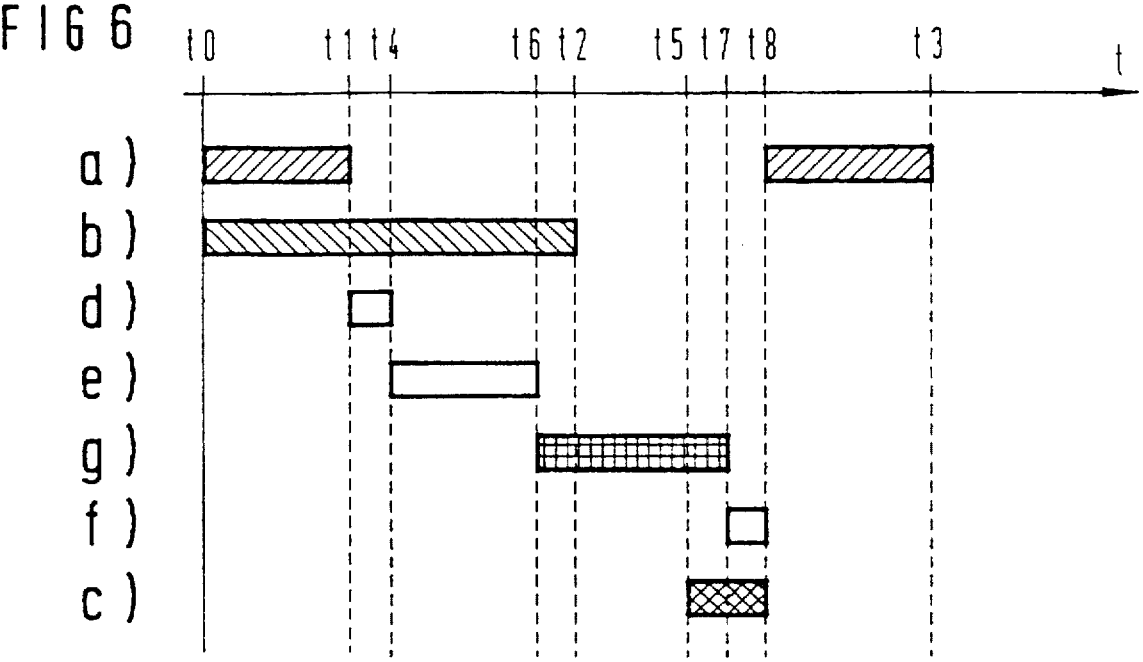
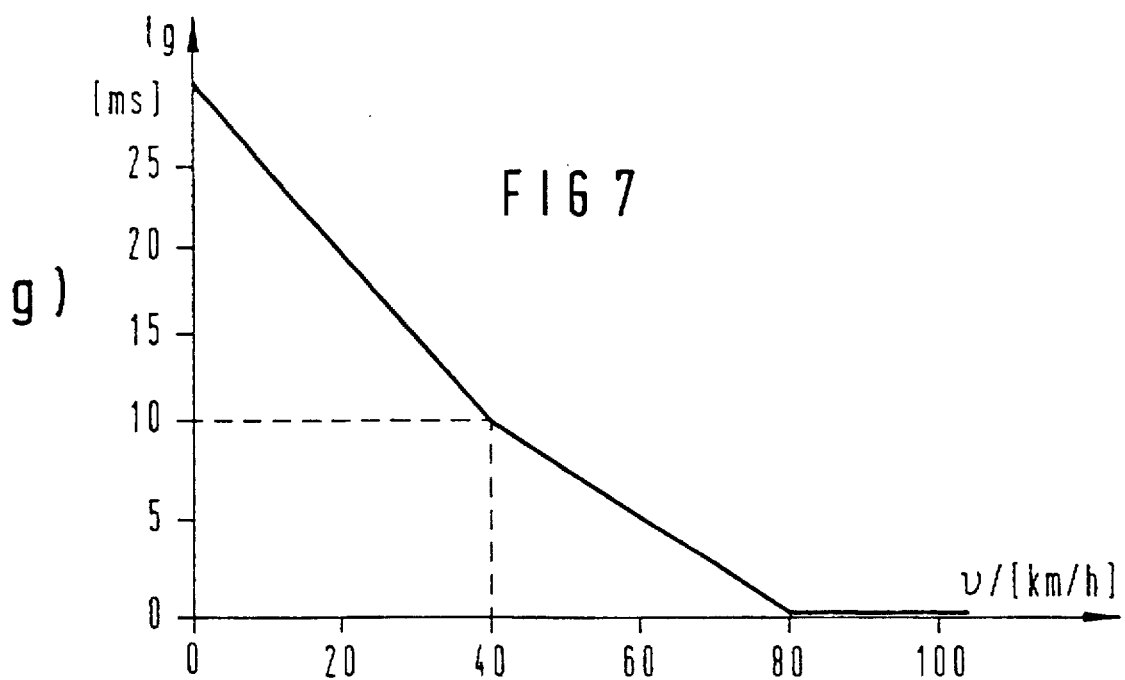

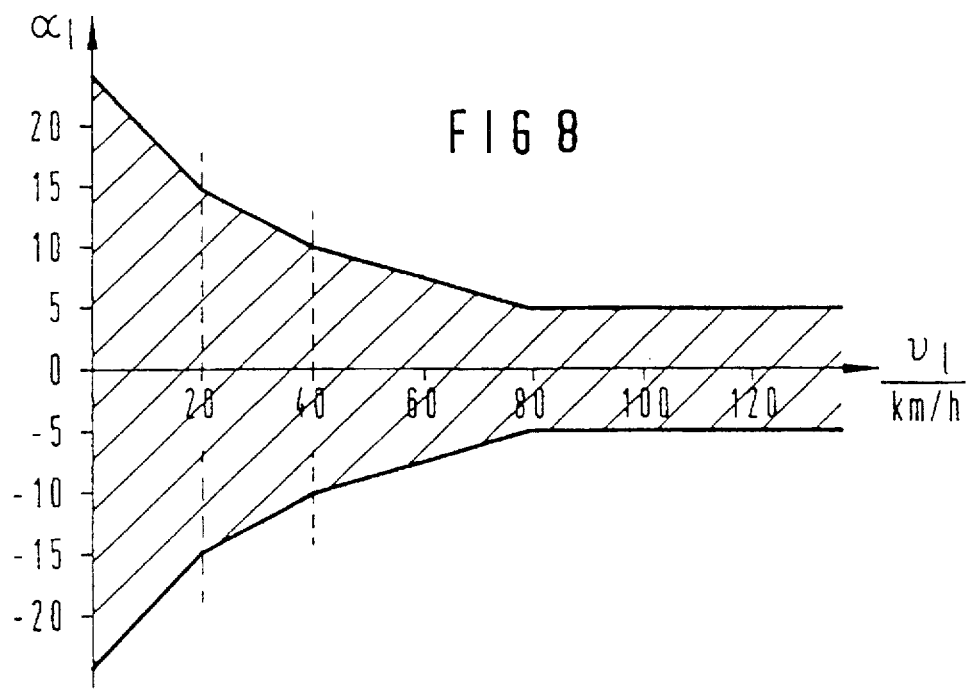
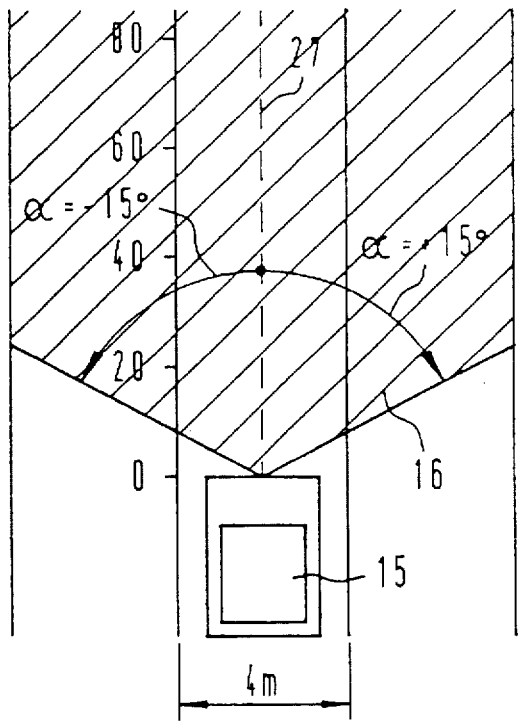
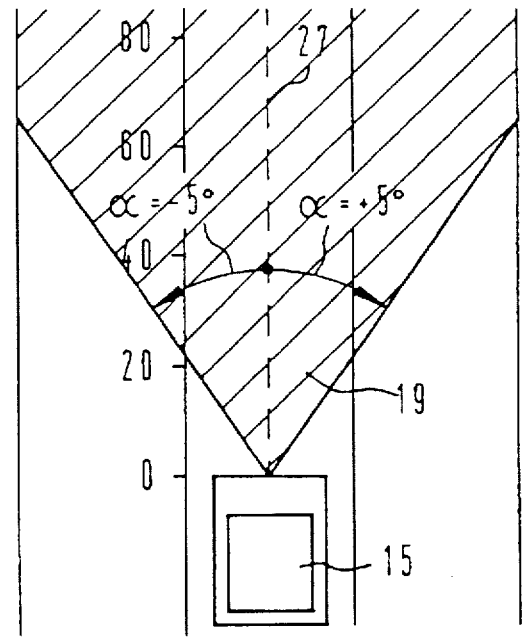

RADAR DEVICE WITH REDUCED POWER EMISSION

BACKGROUND OF THE INVENTION

Field of the Invention

The invention relates to a radar device having a transmitter and a receiver for transmitting and receiving continuously frequency-modulated radar signals, and an evaluation circuit for comparing the transmitted and received radar signals and ascertaining information about the surroundings or environment and in particular a distance from and a relative speed with respect to an object.

The continuously frequency-modulated radar signal is used for measuring vehicle following distance and for relative speed measurement in traffic. A frequency-modulated continuous-wave radar device (FMCW radar device) for measuring following distance and relative speed is known from Published International Patent Application WO 95/12824. The FMCW radar device is mounted on a vehicle and emits transmitting power continuously. The consequence is an increase in microwave noise in the surroundings of the vehicle.

SUMMARY OF THE INVENTION

It is accordingly an object of the invention to provide a radar device with reduced power emission, which overcomes the hereinafore-mentioned disadvantages of the heretofore-known devices of this general type and which on average reduces the power emitted by the radar device without impairing its measurement sensitivity. This is accomplished by reducing the radiation burden in the surroundings of the vehicle.

With the foregoing and other objects in view there is provided, in accordance with the invention, a radar device secured to a vehicle, comprising a transmitter for broadcasting continuously frequency-modulated radar signals over a time range, the time range being fixed as a function of a speed of the vehicle and being longer at a higher speed and shorter at a lower speed; a receiver for receiving the radar signals; and an evaluation circuit for comparing the transmitted and received radar signals to ascertain information about the surroundings and in particular a distance from and a relative speed with respect to an object.

It is especially advantageous to fix the time range within which the transmitter emits radar signals, as a function of the speed of the vehicle in which the radar device is installed. The time range is made shorter as the speed decreases. Especially in city traffic, when vehicle speeds are low, this is advantageous because it reduces the average radiation power emitted by the radar device.

In accordance with another feature of the invention, the time range during which power is emitted is lengthened by the length of time required by the transmitter to reach a predetermined transmission state, or in other words to reach a steady state after being turned on.

In accordance with a further feature of the invention, there is provided an oscillator connected to an emission device through a switch. Since the switch is used, it is unnecessary to turn the oscillator on and off each time. Instead, the oscillator is connected to the emission device only for a predetermined time range.

In accordance with an added feature of the invention, the oscillator is connected to the emission device through an amplifier and the amplifier is turned on and off in accordance with the predetermined time range, for instance by turning the operating voltage of the amplifier on and off.

In accordance with an additional feature of the invention, the time intervals are increased between the time ranges in which power is emitted as the speed of the vehicle decreases.

In accordance with yet another feature of the invention, no radar signals are emitted below a predetermined speed, and especially when the vehicle is stopped, because in that speed range no information for adaptive vehicle speed control is needed.

In accordance with yet a further feature of the invention, a further reduction in the radiation burden is attained by decreasing the angular range within which radar beams are broadcast as the speed of the vehicle increases.

In accordance with yet an added feature of the invention, the angular range is disposed asymmetrically with respect to the travel direction of the vehicle.

In accordance with a concomitant feature of the invention, the receiver has a reception state being adapted to speed and being shorter with a lower speed of the vehicle.

Other features which are considered as characteristic for the invention are set forth in the appended claims.

Although the invention is illustrated and described herein as embodied in a radar device with reduced power emission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a first time diagram;

FIG. 5 is a second time diagram;

FIG. 6 is a third time diagram;

FIG. 7 is a speed graph;

FIG. 8 is an angle graph;

FIGS. 9a and 9b are two angular range graphs; and

FIG. 10 is a frequency diagram.

DESCRIPTION OF THE PREFERRED EMBODIMENTS

Figure 1:
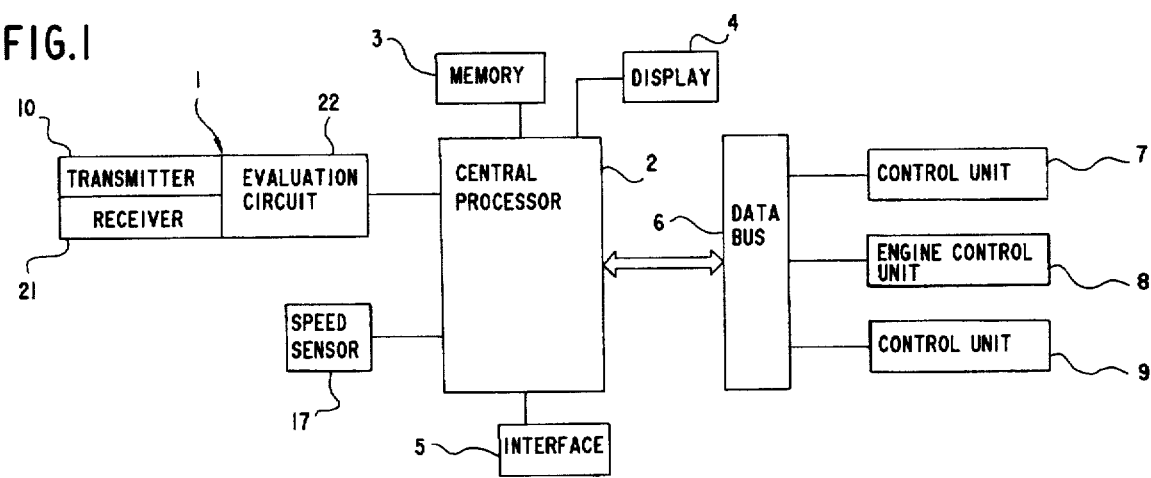
FIG. 1 is a block circuit diagram including a radar device.

Referring now to the figures of the drawings in detail and first, particularly, to FIG. 1 thereof, there is seen a radar device 1, which is connected to a central processor 2 over data and control lines. The central processor 2 is also connected over data lines to a memory 3, a display 4 and an interface 5. The central processor 2 is also connected through a data bus 6 to a control unit 7 for an automatic transmission, to an engine control unit 8 and to a control unit 9 for a brake system. The central processor 2 is additionally connected over a data line to a speed sensor 17. The configuration of FIG. 1 is built into a vehicle.

The radar device 1 has a transmitter 10, a receiver 21 and an evaluation circuit 22. The transmitter 10 emits radar signals that are continuously frequency-modulated (frequency-modulated-continuous-waves). The receiver 21 receives the radar signals reflected by some object. The evaluation circuit 22 ascertains information about the surroundings, and especially the distance from and the relative speed of an object, from a comparison of the emitted radar signals with the received radar signals.

The radar device 1 represents a frequency-modulated continuous-wave radar device, having a mode of operation and layout that are already known from Published International Patent Application WO 95/12824.

Figure 2:
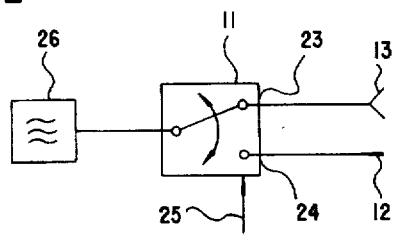
FIG. 2 is block circuit diagram of a first transmitter.

FIG. 2 shows details of the transmitter 10 including a high-frequency oscillator 26, which is connected over a transmission line to one input of a switch 11. The switch 11 has two outputs, namely a first output 23 connected to an emission device 13 and a second output 24 connected to a radiation sink 12. The emission device 13 is constructed as an antenna. The radiation sink 12 acts as a sump that absorbs supplied radar signals and prevents emission of the radar signal. Depending on the position of the switch 11, the transmitter 10 is selectively connected to the emission device 13 or the radiation sink 12. The switch 11 can be switched over by the radar device 1 through a first control line 25.

Figure 3:
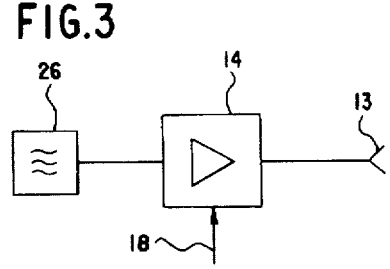
FIG. 3 is block circuit diagram of a second transmitter.

FIG. 3 shows a transmitter in which the high-frequency oscillator 26 is constructed as a voltage-controlled gallium arsenide oscillator. The high-frequency oscillator 26 is connected over a transmission line to an amplifier 14. The amplifier 14 is connected over an output line to an emission device 13. The operating voltage of the amplifier 14 can be turned on and off by the radar device 1 through a second control line 18.

FIG. 4 shows a time diagram that represents various operating states of the radar device 1 as a function of time. In the time diagram, the time t is plotted in the direction to the right. The operating states of the radar device 1 are shown in the form of bars and the length of a bar in the direction of the time axis defines the time range of the corresponding operating state.

A first bar a) identifies a time range within which the transmitter 10 emits radar signals and at the same time reflected radar signals are received by the receiver 21. This time range extends from a time t0 to a time t1.

A second bar b) represents a time range within which the evaluation unit 22 evaluates the emitted and the received radar signals. The evaluation lasts from the time t0 to a time t2.

After the conclusion of the evaluation, a radar signal is again emitted by the transmitter 10 in a time period from the time t2 to a time t3 and is received by the receiver 21. If the transmitters 10 are each used for one portion of the angular range and the transmitters 10 are turned on and off in succession, then a switchover among the transmitters 10 is necessary. The switchover is represented by a third bar c).

From FIG. 4, it can be seen that power is emitted only in the time ranges from t0 to t1 and from t2 to t3. The emitted power on average over time, in comparison with previous systems that emit continuously, is thus reduced by the factor (t1−t0)/(t2−t1), since no power is emitted in a time interval from t1 to t2. The operating states of the radar device from the time t0 to the time t2 are repeated continuously.

FIG. 5 shows a time diagram corresponding to FIG. 4, in which, in addition to the operating states of transmitting and receiving a), evaluating b) and transmitter switchover c), other operating states are indicated, such as: operation of turning off the transmitter d), OFF state of the transmitter e) and operation of turning on the transmitter e). The operating states of the operations of turning off the transmitter d) and turning on the transmitter e), must be taken into account in controlling the transmitter 10, because transient phenomena of the transmitter 10 as it is turned on and off can occur.

A fourth bar d) indicates the time range that the transmitter requires, after the turn-off signal, in order to reduce the emitted power to the value of zero.

A fifth bar e) shows the time range that the transmitter 10 requires after a turn-on signal, in order to adjust the emitted power to a predetermined value that is required to ascertain the information about the surroundings, such as the distance from a vehicle traveling ahead or the relative speed with regard to a vehicle traveling ahead. The time range during which the transmitter 10 emits no power is represented by the fifth bar e), which extends from a time t4 to a time t6.

In the period of time d) from the time t1 to the time t4 and the period of time f) from the time t6 to the time t2, a reduced power is emitted by the transmitter 10.

FIG. 6 shows a time diagram corresponding to FIG. 5, but in which there is a pause g) between the OFF state e) of the transmitter and the turn-on operation f) of the transmitter. The pause g), which extends from the time t6 to a time t7, results from the fact that at a low speed of the vehicle, the time intervals between the emission a) of radar signals is lengthened, since the distance covered by the vehicle per second is relatively low and therefore the surroundings do not vary quickly, so that a lower repetition rate of the transmitting and receiving operating states a) suffices.

The insertion of the pause g) between two successive transmission and reception states a) of the radar device represents a preferred further feature of the invention. The operating states shown in FIG. 6 between the times t0 and t3 are repeated continuously.

FIG. 7 shows a graph in which a time length $t_g$ of the pause g) is plotted in milliseconds over a speed v of the vehicle in kilometers/hour, in which the radar device 1 is integrated. It can be seen from the graph that at a speed of 80 km/h, the additional pause g) is assigned a duration of $t_g$=0. At a speed of 40 km/h, a duration $t_g$ of 10 ms results. The dependency of the duration $t_g$ is stored in the memory 3. The central processor 2, with the aid of the speed sensor 17, ascertains the speed of its own vehicle and selects the length $t_g$ of the pause g) from the characteristic curve of FIG. 7, which is stored in the memory 3.

Another advantageous embodiment of the invention is shown in FIG. 8, which illustrates the dependency of the emission angle α as a function of the speed of the vehicle. In the graph, an angular range α is plotted in degrees of angle at the top, and the speed of the vehicle in which the device is mounted is plotted in kilometers/hour in the direction toward the right. The angular range of 0° corresponds to a line pointing vertically in the travel direction, beginning at the center point of the vehicle.

The dependency of the angular range α on the speed is plotted in the form of a curve for positive and negative angular ranges. A positive angular range originates at the middle of the vehicle and extends to the right in the travel direction, and a negative angular range begins at the middle of the vehicle and extends to the left in the travel direction.

At a speed of 20 km/h, there is a positive and negative angular range of ±15°. At a speed of 40 km/h, there is a positive and negative angular range of ±10°. The values of the angular ranges for a speed are generally equal in size for the positive and negative angular ranges. The dependency of the angular range on the speed is stored in the memory 3. The central processor 2, with the aid of the speed sensor 17, ascertains the speed of the vehicle and sets the angular range for the radar device 1 in accordance with FIG. 8. The angular range α is described in the speed range from 0 to 20 km/h by a straight line with a first slope, and in the speed range from 20 to 40 km/h by a straight line with a second slope which is less than the first slope.

In the speed range from 40 to 80 km/h, the angular range α is defined by a straight line with a third slope, which is less than the second slope. In the case of speeds of 80 km/h or more, the angular range α is fixed at a predetermined value, and in this exemplary embodiment it is fixed to ±5°.

The positive and negative angular ranges are shown in terms of two examples in FIGS. 9a and 9b. In FIG. 9a, a vehicle 15 is shown having a radar device which emits radar signals within an angular range 16 of ±15°. This is accomplished in the form of an electronically scanning transmitter 10 and receiver 21, or with the aid of a plurality of transmitters 10 and receivers 21 each of which is assigned to one portion of the angular range 16.

As can be seen from FIG. 8, the angular range 16 of ±15° corresponds to a vehicle speed of 20 km/h. The angular range 16 has a positive and a negative angular range. Beginning at a center line 27, which extends from the center of the vehicle 15 in the direction of travel, the positive and negative angular ranges extend from the middle of the vehicle in the lateral direction.

FIG. 9b shows a vehicle 15 with an angular range 19, which represents a positive and negative angular range α of ±5°. In accordance with FIG. 8, the angular range of ±5° corresponds to a speed of the vehicle 15 of 80 km/h or more.

An advantageous further feature of the invention is that the negative angular range and the positive angular range are of different sizes, or in other words the angular range is asymmetrical. Thus ranges over which no information is required are not scanned with radar signals. In this way, the radiation burden for regions adjoining the roadway, such as bicycle paths or pedestrian paths, is reduced even further. In right-hand traffic or left-hand traffic, for instance, the positive (right) angular range is smaller than the negative (left) angular range, or the positive angular range is larger than the negative angular range. In cornering, the positive and negative angular range are adapted to suit the driving situations.

The size of the negative and positive angular ranges are included in the memory 3.

The radar device is preferably used to determine the distance from and the relative speed of a vehicle which is ahead, for an adaptive vehicle speed control.

FIG. 10 is a frequency diagram from which the dependency of the transmitting state of the transmitter 10 on the range, resolution and modulation rise is described. A maximum scanning frequency FA is specified by a maximum analog intermediate frequency $FB_{max}$ of the received radar signal, in accordance with the following relationship: $FB_{max} \leq FA/2$.

The maximum intermediate frequency $FB_{max}$ is composed of the sum of a distance frequency shift FR and a Doppler frequency shift FD: $FB_{max} = (FR + |FD|)_{max}$.

The distance frequency shift FR is calculated from the equation: $FR = 2 \cdot (\Delta f/T) \cdot (R/Co)$, wherein $\Delta f$ designates the modulation rise, T the modulation duration, R the range, and Co the speed of light. The modulation rate is designated by the quotient ($\Delta f/T$). The distance frequency shift FR is thus dependent both on the modulation rate and on the distance R of an object from which the distance, or of which the relative speed, is ascertained.

The Doppler frequency shift FD is calculated from the following formula: $FD = (2Vr/\lambda o)$, where $\lambda o = (Co/fo)$ is the wavelength of the radar signals, and Vr is the relative speed. Co is the speed of light, and fo is the mean frequency of the radar signal.

In the description of the following example, it is assumed that the maximum analog intermediate frequency $FB_{max}$ is 100 kHz, and the Doppler frequency shift FD is equal to 0. In other words, there is no relative speed between the vehicle on which the radar device is mounted and the object to be measured. The following relationship results from this:

$$FBmax = FR = 2 \cdot (\Delta f/T) \cdot (R_{max}/CO).$$

In other words, FBmax is proportional to $(\Delta f/T) \cdot R_{max}$. The modulation rise $\Delta f$ should be selected to be constant, independently of the modulation duration T, because the axial separation capacity, which should remain constant, is determined by the modulation rise. Therefore, the modulation duration T is inversely proportional to the range $R_{max}$. At high speeds, a long range $R_{max}$ of the radar device is necessary, since the braking distance, depending on the speed, is correspondingly long and therefore a stationary object, for instance, must be detected soon enough to ensure that braking can still be done.

At low speeds, for instance less than 60 km/h, a shorter range than the maximum range $R_{max}$ of 200 m suffices. For a speed of 50 km/h, a range of 70 m is used. The reason for this lies in the minimum stopping distance before a stationary object. A maximum deceleration $A_{max}$ is typically assumed to be 2 m/s² for an adaptive vehicle speed control system. A minimum stopping distance $D_{min}$ is thus obtained from the equation $D_{min} = (Ve^2/2 A_{max})$, in which Ve is the speed of the vehicle in m/sec and $A_{max}$ is the maximum deceleration of the vehicle in m/sec². At low speeds (Ve<60 km/h) for city traffic, a short range R of the radar device suffices, arbitrarily high relative speeds between vehicles do not occur, and therefore the modulation range ($\Delta f/T$) for a constant modulation rise can be chosen to be higher than for higher speeds, VE>60 km/h, which apply predominantly to limited-access highways and other highways.

The modulation rate is described by the following formula: $(\Delta f/T) = (FR_{max} \cdot Co)/(2 \cdot R_{max})$, wherein $R_{max}$, the maximum range of the radar device for low speeds, is fixed at 70 m, and $FR_{max}$ is fixed at 100 kHz. Since the modulation rise $\Delta f$ remains constant, the modulation rise $\Delta f$ is run through in a shorter time when the modulation rate ($\Delta f/T$) is greater. It follows from this that at a shorter range $R_{max}$, the modulation duration T is accordingly chosen to be shorter.

The range chosen by the central processor 2 for the radar device 1 becomes shorter as the vehicle speed becomes lower, and similarly, the shorter the modulation duration T at the fixed modulation rise and the shorter the transmission time needed for the transmitter 10 to transmit a modulation rise become. As a consequence, the time for receiving a modulation stroke becomes shorter as well. Therefore, the duration of the receiving state of the radar device 1 also becomes shorter as the speed of the vehicle decreases.

The central processor 2 ascertains the speed of the vehicle, and sets the modulation duration T of the transmitter 10 and therefore the transmission time of the transmitter 10 as a function thereof.

The mean power emitted by the transmitter 10 is reduced by adapting the length of the transmission time of the transmitter 10 to the instantaneous speed of the vehicle.

If the modulation rate is increased, both the distance resolution and the distance accuracy remain constant.

FIG. 10 shows a radar signal 30 emitted by the transmitter 10 and a radar signal 31 received by the receiver 21. The frequency of the radar signals is plotted over time in FIG. 10.

A leading or trailing edge of the radar signal is transmitted by the transmitter 10 within the modulation duration T. The leading edge designates the portion of the radar signal that is transmitted, frequency-modulated from a minimum frequency (fo–Δf/2) up to a maximum frequency (fo+Δf/2). The trailing edge designates the portion of the radar signal that is transmitted, frequency-modulated from a maximum frequency (fo+Δf/2) to a minimum frequency (fo–Δf/2).

The evaluation circuit 22 ascertains the transit time TR from the comparison of the transmitted radar signal 30 and the received radar signal 31. The distance from the object that reflects the transmitted radar signal can be calculated from the transit time TR by the following formula: TR=(2R/Co), wherein R is the distance between the vehicle with the radar device and the object, and Co is the speed of light.

The evaluation circuit 22 also ascertains the frequency shift between the transmitted radar signal 30 and the received radar signal 31, which results on the basis of the distance: FR=(2·Δf·R)/(T·Co), wherein Δf is the frequency rise, R the distance, T the modulation duration, and Co the speed of light.

The Doppler frequency shift FD is likewise ascertained by the evaluation circuit 22 from the comparison of the transmitted radar signal 30 and the received radar signal 31, from the following formula: FD=(2·Vr/λ0), wherein Vr is the relative speed and λ0 is the wavelength of the radar signal for the mean frequency fo. The relative speed can thus be ascertained from the Doppler frequency shift FD.

In order to ascertain the following distance and the relative speed, the evaluation circuit 22 compares at least one leading or trailing edge of the transmitted radar signal with at least one leading or trailing edge of the received radar signal. Preferably, however, one leading and one trailing edge of the transmitted radar signal are compared with one leading and one trailing edge of the received radar signal. The transmitter 10 therefore transmits at least one leading or one trailing edge of the radar signal within one time range (in one transmission state).

I claim:

1. A radar device secured to a vehicle, comprising:
    a transmitter for broadcasting continuously frequency-modulated radar signals over a time range, the time range being fixed as a function of a speed of the vehicle and being longer at a higher speed and shorter at a lower speed;
    a receiver for receiving the radar signals; and
    an evaluation circuit for comparing the transmitted and received radar signals to ascertain information about the surroundings.

2. The radar device according to claim 1, wherein said evaluation circuit ascertains a distance from and a relative speed with respect to an object.

3. The radar device according to claim 1, wherein the time range is lengthened by a time that said transmitter requires to attain a predetermined transmission state.

4. The radar device according to claim 1, wherein the time range is lengthened by a time that said transmitter requires to attain a predetermined transmission power.

5. The radar device according to claim 1, wherein the time range is lengthened by a time that said transmitter requires to attain a predetermined frequency stability.

6. The radar device according to claim 1, including an oscillator, an emission device, and a switch for connecting said oscillator to said emission device only for the time range.

7. The radar device according to claim 1, including an oscillator, an emission device, and an amplifier connecting said oscillator to said emission device and switching to amplification for the time range.

8. The radar device according to claim 1, wherein time intervals during which said transmitter does not transmit any radar signals are adapted, as a function of the speed of the vehicle, to become greater at lower speed.

9. The radar device according to claim 1, wherein said transmitter does not transmit any radar signals below a predetermined speed of the vehicle.

10. The radar device according to claim 1, wherein said transmitter emits radar signals within an angular range disposed in the travel direction of the vehicle, and the angular range is decreased with increasing speed of the vehicle, as a function of the speed of the vehicle.

11. The radar device according to claim 10, wherein the angular range is oriented asymmetrically with respect to the travel direction of the vehicle.

12. The radar device according to claim 1, wherein said receiver has a reception state being adapted to speed and being shorter with a lower speed of the vehicle.

* * * * *